United States Patent [19]
Pugh

[11] Patent Number: 6,062,354
[45] Date of Patent: May 16, 2000

[54] DRUM BRAKE SHOE HOLD-DOWN SPRING PLATE

[75] Inventor: Michael Stephen Pugh, Birmingham, United Kingdom

[73] Assignee: Lucase Industries, United Kingdom

[21] Appl. No.: 08/982,745

[22] Filed: Dec. 2, 1997

[30] Foreign Application Priority Data

Dec. 4, 1996 [GB] United Kingdom .................. 9625161

[51] Int. Cl.[7] ............................. F16D 51/00; F16D 65/04; F16B 21/18
[52] U.S. Cl. ............................ 188/341; 188/234; 411/516
[58] Field of Search .................................. 188/340, 341, 188/234; 411/516, 520, 522, 523, 524

[56] References Cited

U.S. PATENT DOCUMENTS

| | | | |
|---|---|---|---|
| 1,933,724 | 11/1933 | Fox ........................................ | 411/522 |
| 2,162,167 | 6/1939 | Greterman .............................. | 411/523 |
| 2,352,392 | 6/1944 | Kost ....................................... | 411/523 |
| 2,755,889 | 7/1956 | Schnell ................................ | 188/340 X |
| 3,152,664 | 10/1964 | Swift .................................... | 188/340 X |
| 3,433,121 | 3/1969 | Vondran ................................. | 411/918 |
| 3,459,096 | 8/1969 | Parkin .................................... | 411/523 |
| 3,675,958 | 7/1972 | Duffy ............................. | 287/189.36 D |
| 3,941,218 | 3/1976 | Torii .................................... | 188/106 F |
| 4,623,050 | 11/1986 | Copp ...................................... | 188/340 |
| 5,086,662 | 2/1992 | Tayon et al. ........................... | 411/523 |
| 5,540,310 | 7/1996 | Ludtke et al. ......................... | 188/340 |

FOREIGN PATENT DOCUMENTS

| | | |
|---|---|---|
| 08284987 | 11/1996 | Japan . |
| WO93/12356 | 6/1993 | WIPO . |

*Primary Examiner*—Robert J. Oberleitner
*Assistant Examiner*—Jeffrey Woller
*Attorney, Agent, or Firm*—Michael Best & Friedrich LLP

[57] ABSTRACT

A spring plate intended to form part of a drum brake shoe hold-own device of the general kind in which a retaining pin anchored, in use, on the brake back plate and passing through an opening in the brake shoe web, cooperates with the spring plate to limit movement of the web away from the backplate against which it normally rests. The spring plate has a pair of arms of which respective opposed major generally planar faces are superposed so that, in use, in a brake, mutual abutment of the faces limits movement of the shoe away from the back plate.

28 Claims, 2 Drawing Sheets

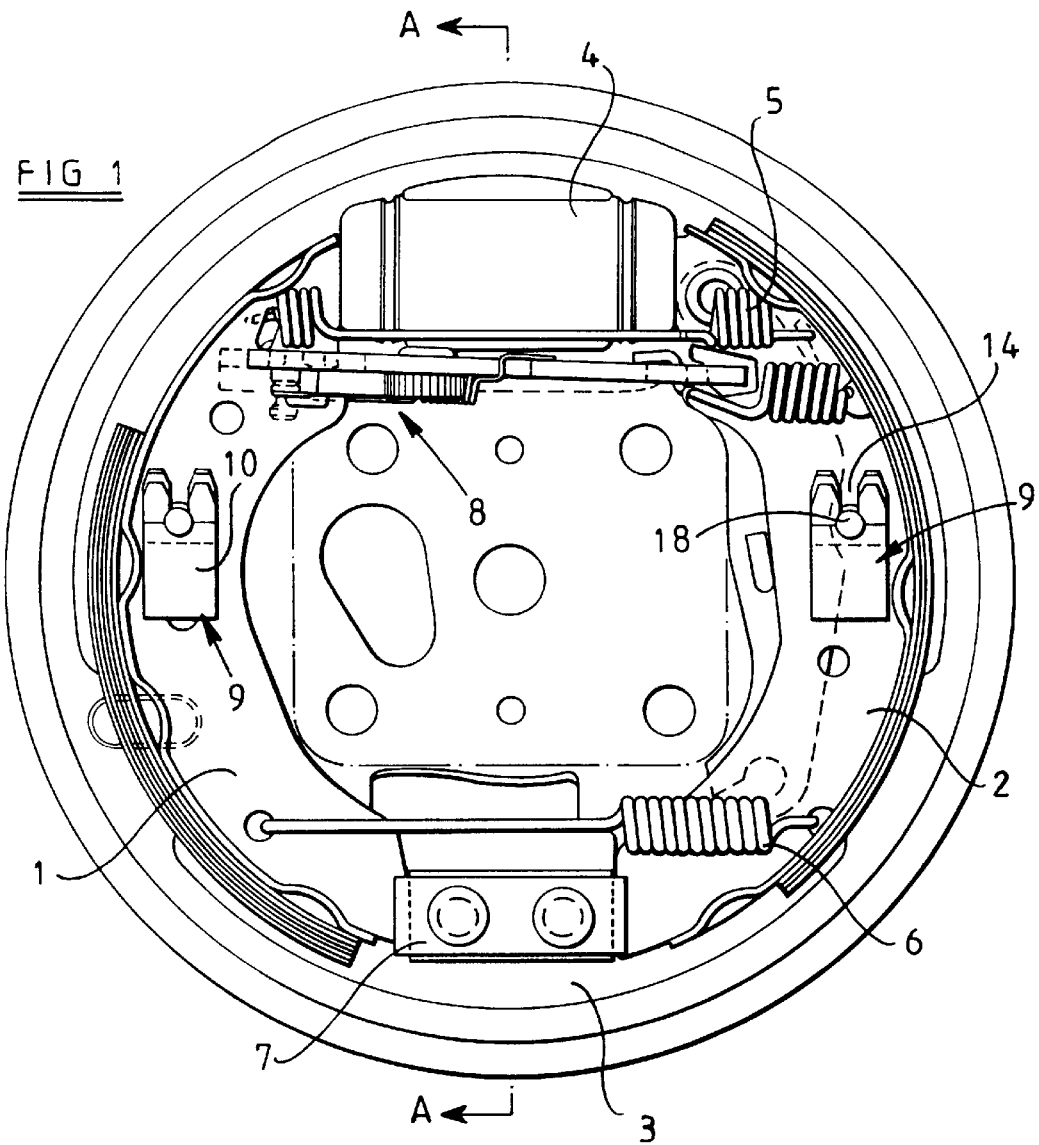
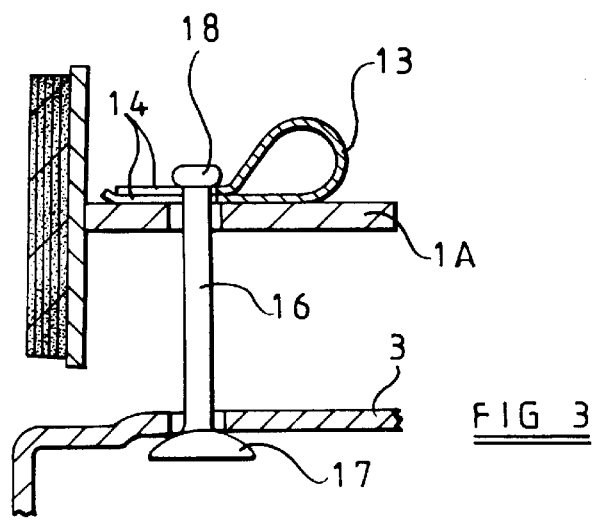

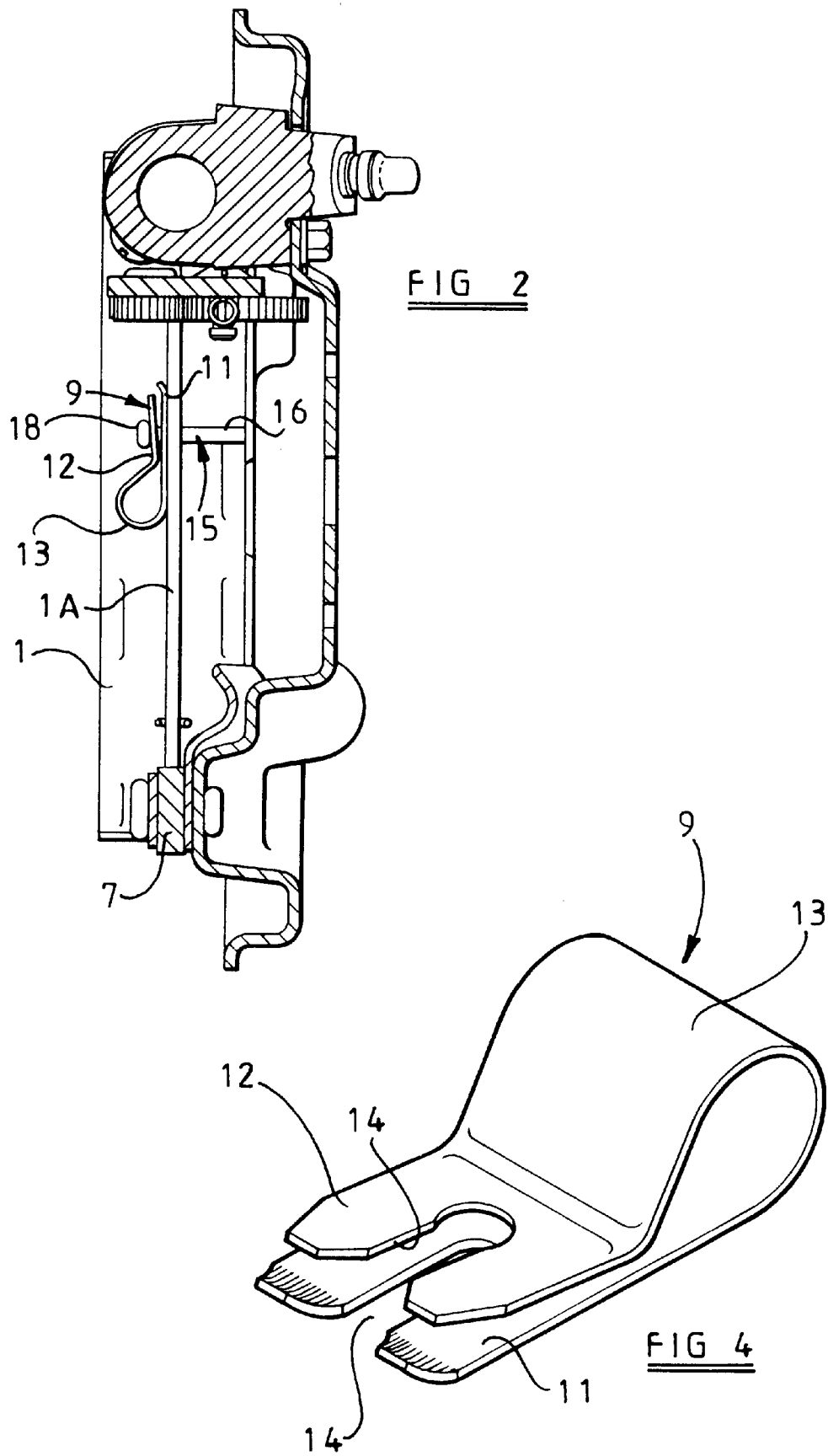

DRUM BRAKE SHOE HOLD-DOWN SPRING PLATE

This invention relates to a spring plate intended to form part of a drum brake shoe hold-down device of the general kind in which a retaining pin anchored, in use, on the brake back plate and passing through an opening in the brake shoe web, cooperates with the spring plate to limit movement of the shoe away from the back plate against which it normally rests, respective parts of the shoes engaging an actuator operable to separate the shoes, in use, to engage a rotary brake drum.

One existing proposal for the same purpose is disclosed in our U.S. Pat. No. 5,540,310 and includes a generally U-shaped spring plate arranged in use, with one of its arms lying against a brake shoe web, the other arm cooperating with a pin extending through both arms and anchored on the backplate, such that the spring plate acts via the pin to apply a resilient force urging the shoe against the backplate. Lifting of the shoe from the backplate is limited by in-turned portions at the ends of the arms coming into abutment when the maximum permissible lifting movement has taken place, which movement should be less than that necessary to disengage the shoe from the brake actuator. The use of such in-turned portions as abutments requires a substantial spacing between the arms, necessitating a relatively long connecting pin for anchoring the shoe web to the back plate and leading to relatively high manufacturing costs.

An object of the invention is to provide an improved spring plate intended for use as part of a drum brake shoes hold-own device of the aforesaid general kind and which can provide an improved shoe anti-lift performance while being more cost-effective to produce than some similar conventional devices.

According to one aspect of the present invention, a spring plate for use as part of a drum brake shoe hold-own device comprises a pair of arms of which respective opposed major generally planar faces are superposed so that, in use, in an internal shoe drum brake, mutual abutment of said faces limits movement of a shoe away from the backplate.

In one preferred arrangement, respective adjacent ends of the arms are interconnected by a resilient formation, conveniently curvate, serving to maintain the arms normally in mutually spaced relationship.

Conveniently, the intended upper arm is shorter than the lower arm and the connecting formation extends between adjacent ends of the arms, overlying part of the lower arm.

According to another aspect of the invention, a shoe hold-down device comprises a spring plate according to the first aspect of the invention, and a pin which, in use, connects the plate to the brake backplate under stress with the arms spaced apart, such that the shoe is urged by the plate towards the backplate, the pin providing an abutment for one arm of the plate, enabling excessive lifting of the shoe from the backplate to be prevented by mutual abutment of the aforesaid respective generally planar faces of the arms.

The invention will now be described, by wart of example, with reference to the accompanying drawings in which:

FIG. 1 is a front end view of a shoe drum brake incorporating the shoe hold-down spring plate of the invention as part of a shoe hold-down device;

FIG. 2 is a cross-section along the line A—A of FIG. 1;

FIG. 3 is a detail showing part of the brake of FIGS. 1 and 2 in an alternative operative condition, and FIG. 4 is an enlarged perspective view of the spring plate forming part of FIGS. 1 to 3.

Referring to FIGS. 1 and 2 of the drawings, these illustrate one form of shoe drum brake in which a pair of brake shoes 1, 2 are mounted on a backplate 3 and arranged with one pair of adjacent shoe ends engaged with an actuating device 4, illustrated as an hydraulic cylinder, operable to expand the shoes, against the action of return springs 5, 6 into braking engagement with a rotary drum (not shown). The other pair of adjacent shoe ends are engaged with an abutment 7, integral with or rigidly secured to the backplate and serving to sustain braking torque arising on the leading shoe, depending upon the direction of drum rotation. An automatic adjuster device, indicated generally at 8, serves to maintain a substantially constant minimum shoe to drum clearance, in conventional manner, during normal wear of the brake shoes in use. This mechanism forms no part of the present invention and requires no further description.

Each brake shoe is held against the backplate 3 by a respective hold-down device, indicated generally at 9. The two devices illustrated are identical and only one will be described in detail.

Each hold-down device 9 includes a spring plate 10 which, as can be seen more clearly from FIGS. 3 and 4, includes a pair of generally parallel superposed arms 11, 12, respective ends of which are joined together by a curvate portion 13. It can be seen clearly from FIG. 3 that the free end portions of the arms are provided with respective aligned slots 14, through which, in the complete assembly of FIGS. 1 to 3, passes an anchor pin 15 forming part of the device and having a shank 16 connected at one end to a relatively large head 17 lying, in use, against the outer surface of the backplate 3. The other end of the pin is provided with a smaller head formation 18 which, with the shank 16 located within the slots 14, lies against the outer surface of the outermost arm 12. As can be seen from FIG. 2, the arm 11 of the spring plate 10 lies against the shoe web 1A and the length of the pin 15 is chosen so that its assembly with the spring plate 10 can only be achieved by compressing the two arms 11 and 12 somewhat, thereby creating a resilient force through the pin, which is reacted against the backplate in order to hold the shoe 1 against the latter. The arms 11 and 12 of the spring plate remain separated during normal operation of the brake and permit a degree of movement of the shoe in a direction away from the backplate which, to a limited extent is normal and acceptable during brake operation.

The particular arrangement of the arms 11 and 12 of the spring plate 10 provides an effective and reliable means for limiting the movement of the brake shoe away from the backplate. In effect, the arm 12 is rigidly anchored by abutment with the head 18 of the pin, the pin being itself anchored to the backplate by the head 17. Since the arm 11 rests upon the web 1A of the shoe, movement of the latter away from the backplate will bring the arm 11 towards the arm 12, and once the permitted travel of the shoe from the backplate has taken place, the planar opposed major surfaces of the arms will come into abutment and provide resistance to further movement of the shoe in that direction (FIG. 3). Because the abutting arms effectively constitute a solid arm having considerably more stiffness than a single arm, the resistance to further lifting of the shoe is considerably enhanced, as compared with some conventional devices. When the force urging the shoe away from the backplate is removed, the spring plate will move the shoe once more into engagement with the backplate. It will be understood that the curved portion 13 of the spring plate provides the major resilient force and, because the arms 11 and 12 are normally relatively close together, the length of the pin shank required to connect the spring plate to the backplate is considerably foreshortened as compared with some conventional devices, leading to a reduction in manufacturing costs.

It will be understood that the shape of the spring plate may be varied as desired, consistent with the concept of shoe lift being limited by abutment between planar surfaces, at least one of which is formed by the side, as distinct from an edge, of the spring plate.

The invention will be understood to embrace an internal shoe drum brake incorporating a shoe hold-down device, including a spring plate of the kind defined and described herein.

I claim:

1. A spring plate for a drum brake shoe hold-down device, the spring plate comprising:
    a fist arm having a first aperture;
    a second arm having a second aperture;
    a resilient formation connecting said first arm in spaced relation to said second arm, said first arm and said second arm forming a planar contact surface when said first arm and said second arm are compressed together.

2. The spring plate as claimed in claim 1, wherein said first arm is in substantially parallel spaced relation to said second arm.

3. The spring plate as claimed in claim 1, wherein said resilient formation is connected to a first end of said first arm and a first end of said second arm.

4. The spring plate as claimed in claim 3, wherein said first arm is shorter than said second arm.

5. The spring plate as claimed in claim 4, wherein said first arm includes a second end and said second arm includes a second end, said second end of said first arm being aligned with said second end of said second arm.

6. The spring plate as claimed in claim 1, wherein said first arm includes a second end and said second arm includes a second end, said second end of said first arm being aligned with said second end of said second arm.

7. The spring plate as claimed in claim 1, wherein said first arm includes a second end and said first aperture in said first arm is a longitudinal slot communicating with said second end of said first arm.

8. The spring plate as claimed in claim 7, wherein said second arm includes a second end and said second aperture in said second arm is a longitudinal slot communicating with said second end of said second arm.

9. The spring plate as claimed in claim 1, wherein said resilient formation is curvate.

10. The spring plate as claimed in claim 1, further comprising a pin extending through said first aperture and said second aperture, and wherein said resilient formation extends a greater distance along an axial direction of said pin than the spaced relation between said first arm and said second arm.

11. A drum brake assembly comprising:
    a backplate;
    a spring plate including;
        a first arm having a first aperture;
        a second arm having a second aperture;
        a resilient formation connecting said first arm in spaced relation to said second arm, said first arm and said second arm forming a planar contact surface when said first arm and said second arm are compressed together;
    a brake shoe;
    a pin connecting said spring plate to said back plate such that said spring plate biases said brake shoe against said backplate; and
    wherein said brake shoe is permitted to move away from said backplate during operation of the drum brake assembly until said first arm and said second arm of said spring plate are compressed together.

12. The drum brake assembly as claimed in claim 11, wherein said pin extends through said backplate, said apertures in said arms and a web on said brake shoe, said pin including a first head at one end that engages an outer surface on the one of said first or second arms that is further from said web on said brake shoe and a second head on an opposite end that engages said backplate.

13. The drum brake assembly as claimed in claim 11, wherein said first arm is in substantially parallel spaced relation to said second arm.

14. The drum brake assembly as claimed in claim 11, wherein said resilient formation is connected to a first end of said first arm and a first end of said second arm.

15. The drum brake assembly as claimed in claim 14, wherein said first arm is shorter than said second arm.

16. The drum brake assembly as claimed in claim 15, wherein said first arm includes a second end and said second arm includes a second end, said second end of said first arm being aligned with said second end of said second arm.

17. The drum brake assembly as claimed in claim 11, wherein said first arm includes a second end and said second arm includes a second end, said second end of said first arm being aligned with said second end of said second arm.

18. The drum brake assembly as claimed in claim 11, wherein said first arm includes a second end and said first aperture in said first arm is a longitudinal slot communicating with said second end of said first arm.

19. The drum brake assembly as claimed in claim 18, wherein said second arm includes a second end and said second aperture in said second arm is a longitudinal slot communicating with said second end of said second arm.

20. The drum brake assembly as claimed in claim 11, wherein said resilient formation extends a greater distance along an axial direction of said pin than the spaced relation between said first arm and said second arm.

21. The drum brake assembly as claimed in claim 11, wherein said resilient formation is curvate.

22. A kit for addition to a backplate to form a drum brake assembly, said kit comprising:
    a brake shoe;
    a spring plate including;
        a first arm having a first aperture;
        a second arm having a second aperture;
        a resilient formation connecting said first arm in spaced relation to said second arm, said first arm and said second arm forming a planar contact surface when said first arm and said second arm are compressed together;
    a pin connecting said spring plate to the backplate such that said spring plate biases said brake shoe against the backplate; and
    wherein said brake shoe is permitted to move away from the backplate during operation of the drum brake assembly unit said first arm and said second arm of said spring plate are compressed together.

23. The kit as claimed in claim 22, wherein said first arm is in substantially parallel spaced relation to said second arm.

24. The kit as claimed in claim 22, wherein said resilient formation is connected to a first end of said first arm and a first end of said second arm.

25. The kit as claimed in claim 22, wherein said first arm includes a second end and said second arm includes a second end, said second end of said first arm being aligned with said second end of said second arm.

26. The kit as claimed in claim 22, wherein said resilient formation extends a greater distance along an axial direction of said pin than the spaced relation between said first arm and said second arm.

27. The kit as claimed in claim 22, wherein said resilient formation is curvate.

28. The kit as claimed in claim 22, wherein said pin extends through said backplate, said apertures in said arms and a web on said brake shoe, said pin including a first head at one end that engages an outer surface on the one of said first or second arms that is further from said web on said brake shoe and a second head on an opposite end that engages said backplate.

* * * * *

UNITED STATES PATENT AND TRADEMARK OFFICE
CERTIFICATE OF CORRECTION

PATENT NO. : 6,062,354
DATED : May 16, 2000
INVENTOR(S) : Michael Stephen Pugh

It is certified that error appears in the above-indentified patent and that said Letters Patent is hereby corrected as shown below:

On the cover page, delete the following:
Item [73] Assignee: Lucase Industries

On the cover page, ADD the following:

Assignee: Lucas Industries, a public limited company

Signed and Sealed this

Twentieth Day of March, 2001

Attest:

NICHOLAS P. GODICI

*Attesting Officer*     *Acting Director of the United States Patent and Trademark Office*